(12) United States Patent
Okamoto

(10) Patent No.: US 8,400,521 B2
(45) Date of Patent: Mar. 19, 2013

(54) ELECTRONIC CAMERA

(75) Inventor: Masayoshi Okamoto, Daito (JP)

(73) Assignee: SANYO Electric Co., Ltd., Moriguchi-shi, Osaka (JP)

(*) Notice: Subject to any disclaimer, the term of this patent is extended or adjusted under 35 U.S.C. 154(b) by 306 days.

(21) Appl. No.: 12/981,658

(22) Filed: Dec. 30, 2010

(65) Prior Publication Data

US 2011/0164144 A1 Jul. 7, 2011

(30) Foreign Application Priority Data

Jan. 7, 2010 (JP) ................................. 2010-001735

(51) Int. Cl.
*H04N 5/228* (2006.01)
*H04N 5/235* (2006.01)
*H04N 5/33* (2006.01)
*H04N 5/00* (2011.01)

(52) U.S. Cl. .................. 348/222.1; 348/229.1; 382/165; 382/118

(58) Field of Classification Search ............... 348/222.1, 348/221.1, 223.1, 229.1, 362–368; 358/452; 382/165, 118

See application file for complete search history.

(56) References Cited

U.S. PATENT DOCUMENTS

| | | | |
|---|---|---|---|
| 2006/0270917 A1* | 11/2006 | Pfeiler | 600/300 |
| 2009/0304279 A1* | 12/2009 | Mori | 382/169 |
| 2011/0216222 A1* | 9/2011 | Niyagawa et al. | 348/231.99 |
| 2012/0002067 A1* | 1/2012 | Fukata | 348/222.1 |

FOREIGN PATENT DOCUMENTS

JP 2009-218689 A 9/2009

* cited by examiner

*Primary Examiner* — Aung S Moe
*Assistant Examiner* — Mekonnen Dagnew
(74) *Attorney, Agent, or Firm* — Westerman, Hattori, Daniels & Adrian, LLP

(57) ABSTRACT

An electronic camera includes an imager, having an imaging surface capturing a scene, which repeatedly outputs a scene image. An extractor extracts a specific reference image coincident with a partial image outputted from the imager corresponding to a predetermined area allocated to the imaging surface, from among a plurality of reference images. An adjuster executes a process of adjusting an exposure amount by emphasizing the predetermined area in parallel with the extraction process. An identifier identifies a color of an object equivalent to the partial image, corresponding to extracting the specific reference image. A corrector executes a process of correcting a tonality of the scene image with reference to the identified result, in place of the extraction process. A searcher searches for a partial image coincident with the specific reference image from the scene image having the corrected tonality.

10 Claims, 18 Drawing Sheets

FIG.3

GLDC

| DOG | | CAT | | RABBIT | |
|---|---|---|---|---|---|
| FP_1 | AFGHAN HOUND | FP_46 | MAINE COON | FP_61 | NETHERLAND DWARF |
| FP_2 | ALASKAN MALAMUTE | FP_47 | AMERICAN SHORTHAIR | FP_62 | MINI REX |
| FP_3 | SIBERIAN HUSKY | FP_48 | EGYPTIAN MAU | FP_63 | LION LOP |
| ⋮ | ⋮ | ⋮ | ⋮ | ⋮ | ⋮ |
| FP_45 | POMERANIAN | FP_60 | MINSKIN | FP_70 | JERSY WOOLY |

FIG.4

RGST1

| FACE PATTERN NO. | | | | | | |
|---|---|---|---|---|---|---|
| CHECKING DEGREE | | | | | | |

(A) MULTI-PHOTOMETRY (B) CENTER-WEIGHTED PHOTOMETRY (A) CURVATURE: STANDARD  (B) CURVATURE: STRONG

ELECTRONIC CAMERA

CROSS REFERENCE OF RELATED APPLICATION

The disclosure of Japanese Patent Application No. 2010-1735, which was filed on Jan. 7, 2010, is incorporated herein by reference.

BACKGROUND OF THE INVENTION

1. Field of the Invention

The present invention relates to an electronic camera. More particularly, the present invention relates to an electronic camera which searches for an image coincident with a designated image from a scene image outputted from an imaging device.

2. Description of the Related Art

According to one example of this type of camera, an image outputted from a CCD is divided into a plurality of small regions corresponding to a position of a face of a human, and is also divided into a plurality of normal regions corresponding to a position of an object different from the face of the human. A light amount of a flash is adjusted based on a plurality of luminance respectively detected from thus divided plurality of regions. Thereby, a photometric result being appropriate for the face of the human is obtained.

However, the above-described camera is not intended to detect the object different from the face of the human, and thus, a capability of detecting the object is limited.

SUMMARY OF THE INVENTION

An electronic camera according to the present invention, comprises: an imager, having an imaging surface capturing a scene, which repeatedly outputs a scene image; an extractor which extracts a specific reference image coincident with a partial image outputted from the imager corresponding to a predetermined area allocated to the imaging surface, from among a plurality of reference images; an adjuster which executes a process of adjusting an exposure amount of the imaging surface by emphasizing the predetermined area in parallel with an extraction process of the extractor; an identifier which identifies a color of an object equivalent to the partial image noticed by the extractor, corresponding to extracting the specific reference image by the extractor; a corrector which executes a process of correcting a tonality of the scene image outputted from the imager with reference to an identified result of the identifier, in place of the extraction process of the extractor; and a searcher which searches for a partial image coincident with the specific reference image extracted by the extractor from the scene image having the tonality corrected by the corrector.

An imaging control program product according to the present invention is an imaging control program product executed by a processor of an electronic camera provided with an imager, having an imaging surface capturing a scene, which repeatedly outputs a scene image, comprises: an extracting step which extracts a specific reference image coincident with a partial image outputted from the imager corresponding to a predetermined area allocated to the imaging surface, from among a plurality of reference images; an adjusting step which executes a process of adjusting an exposure amount of the imaging surface by emphasizing the predetermined area in parallel with an extracting process of the extracting step; an identifying step which identifies a color of an object equivalent to the partial image noticed by the extracting step, corresponding to extracting the specific reference image by the extracting step; a correcting step which executes a process of correcting a tonality of the scene image outputted from the imager with reference to an identified result of the identifying step, in place of the extraction process of the extracting step; and a searching step which searches for a partial image coincident with the specific reference image extracted by the extracting step from the scene image having the tonality corrected by the correcting step.

An imaging control method according to the present invention is an imaging control method executed by an electronic camera provided with an imager, having an imaging surface capturing a scene, which repeatedly outputs a scene image, comprises: an extracting step which extracts a specific reference image coincident with a partial image outputted from the imager corresponding to a predetermined area allocated to the imaging surface, from among a plurality of reference images; an adjusting step which executes a process of adjusting an exposure amount of the imaging surface by emphasizing the predetermined area in parallel with an extraction process of the extracting step; an identifying step which identifies a color of an object equivalent to the partial image noticed by the extracting step, corresponding to extracting the specific reference image by the extracting step; a correcting step which executes a process of correcting a tonality of the scene image outputted from the imager with reference to an identified result of the identifying step, in place of the extraction process of the extracting step; and a searching step which searches for a partial image coincident with the specific reference image extracted by the extracting step from the scene image having the tonality corrected by the correcting step.

The above described features and advantages of the present invention will become more apparent from the following detailed description of the embodiment when taken in conjunction with the accompanying drawings.

BRIEF DESCRIPTION OF THE DRAWINGS

FIG. 3 is an illustrative view showing one example of a configuration of a general dictionary referred to in the embodiment in FIG. 2;

FIG. 4 is an illustrative view showing one example of a configuration of a register referred to in a pet registration mode;

FIG. 5(B) is an illustrative view showing one example of an image representing an animal captured corresponding to center-weighted photometry in the pet registration mode;

FIG. 8 (B) is an illustrative view showing another example of the extraction dictionary created in the pet registration mode;

FIG. 11 (B) is an illustrative view showing one example of an animal image which has a tonality adjusted with reference to a γ correction curve having a strong curvature;

DETAILED DESCRIPTION OF THE PREFERRED EMBODIMENTS

Figure 1:
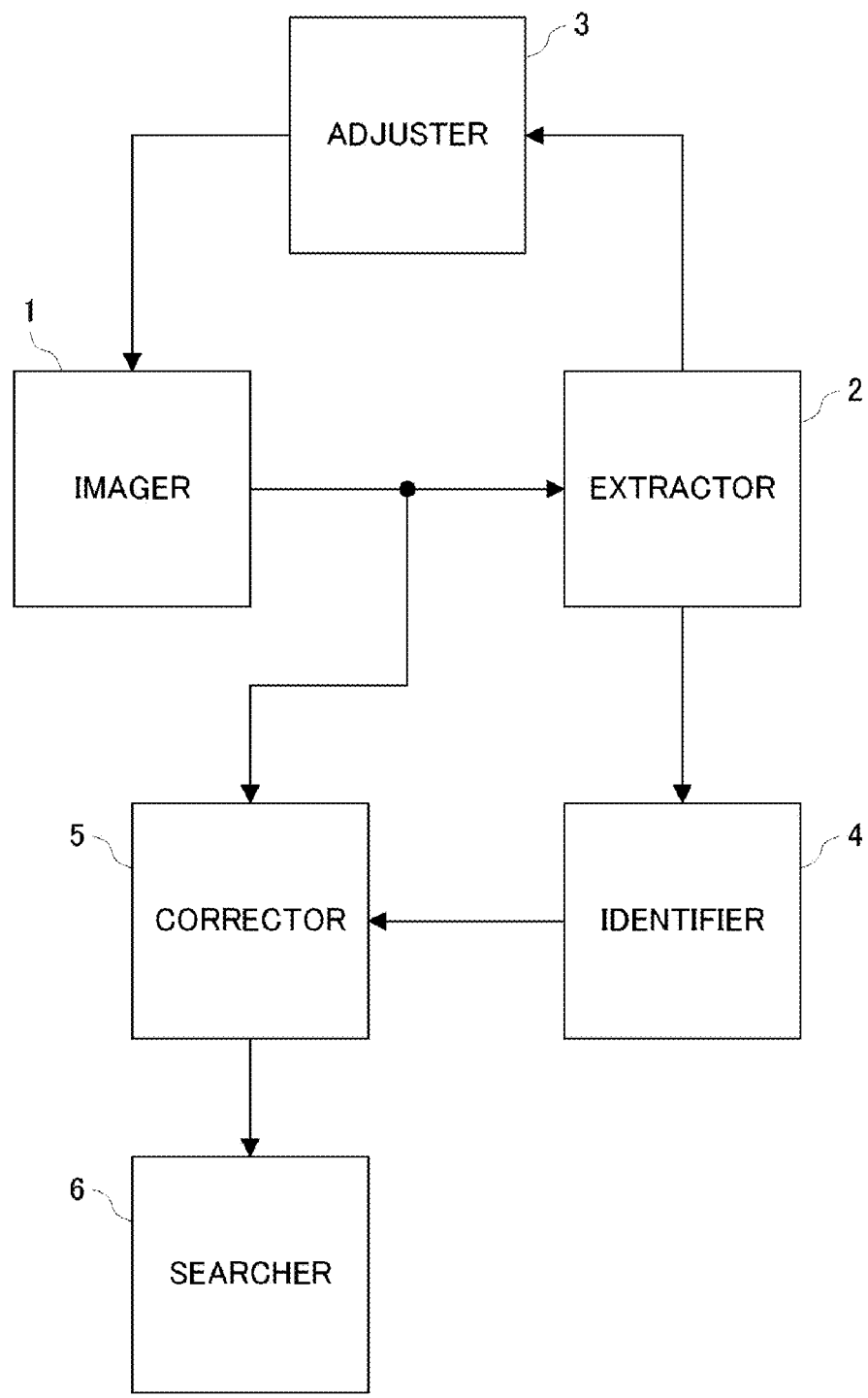
FIG. 1 is a block diagram showing a basic configuration of one embodiment of the present invention.

With reference to FIG. 1, an electronic camera of one embodiment of the present invention is basically configured as follows: An imager 1, having an imaging surface capturing a scene, repeatedly outputs a scene image. An extractor 2 extracts a specific reference image coincident with a partial image outputted from the imager 1 corresponding to a predetermined area allocated to the imaging surface, from among a plurality of reference images. An adjuster 3 executes a process of adjusting an exposure amount of the imaging surface by emphasizing the predetermined area in parallel with an extraction process of the extractor 2. An identifier 4 identifies a color of an object equivalent to the partial image noticed by the extractor 2, corresponding to extracting the specific reference image by the extractor 2. A corrector 5 executes a process of correcting a tonality of the scene image outputted from the imager 1 with reference to an identified result of the identifier 4, in place of the extraction process of the extractor 2. A searcher 6 searches for a partial image coincident with the specific reference image extracted by the extractor 2 from the scene image having the tonality corrected by the corrector 5.

The specific reference image is equivalent to a reference image coincident with the partial image outputted corresponding to the predetermined area on the imaging surface. When the extraction process for the specific reference image is executed, the exposure amount of the imaging surface is adjusted by emphasizing the predetermined area. Thereby, a performance of extracting the specific reference image is improved. The color of the object equivalent to the partial image outputted corresponding to the predetermined area is identified corresponding to extracting the specific reference image, and the tonality of the scene image used for searching for the partial image coincident with the specific reference image is corrected with reference to the identified result. As a result, in cooperation with the above described improvement of the performance of extracting the specific reference image, a performance of detecting an object corresponding to the specific reference image is improved.

Figure 2:
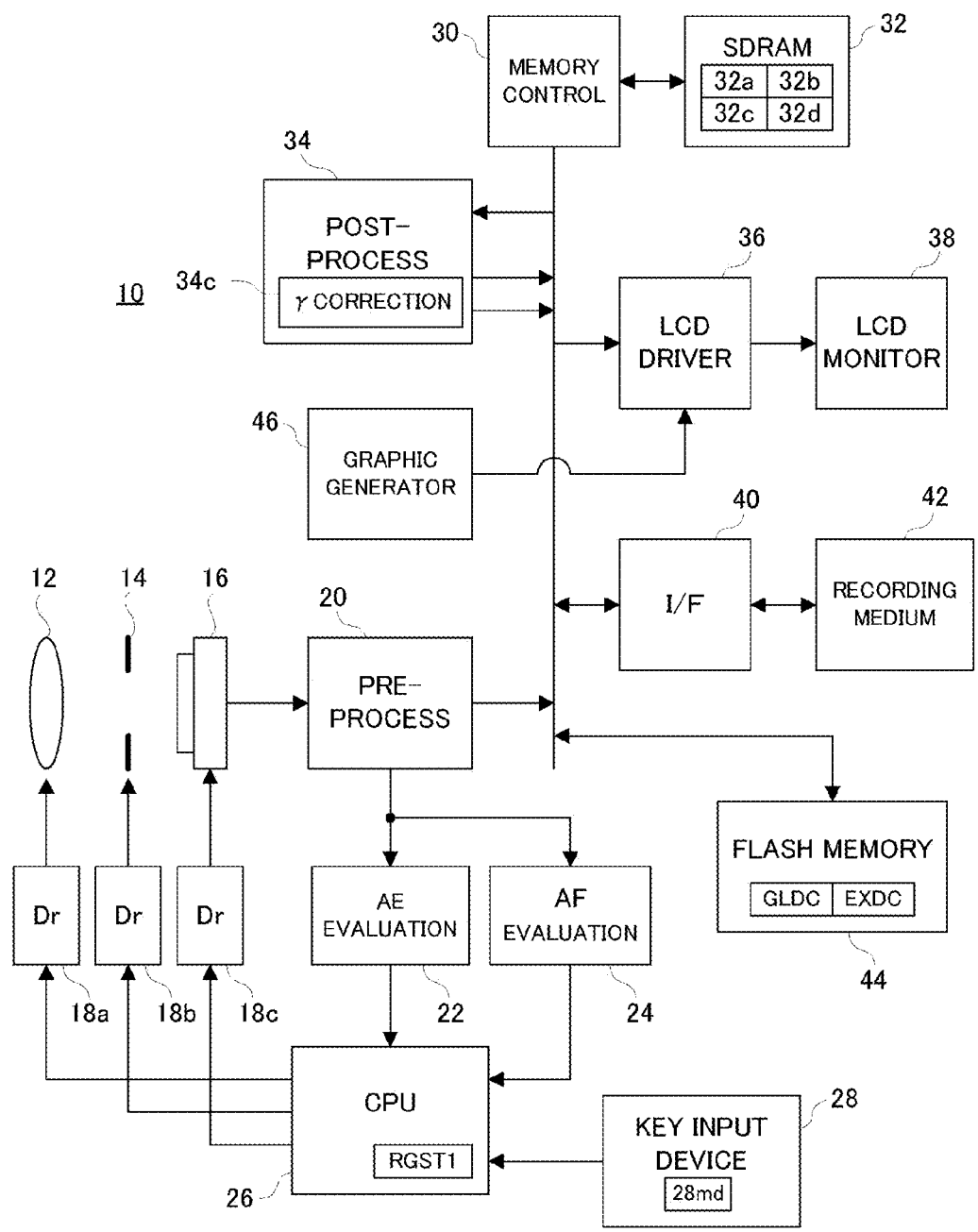
FIG. 2 is a block diagram showing a configuration of one embodiment of the present invention.

With reference to FIG. 2, a digital camera 10 according to this embodiment includes a focus lens 12 and an aperture unit 14 respectively driven by drivers 18a and 18b. An optical image of the scene that undergoes these components enters, with irradiation, the imaging surface of an imager 16, and is subjected to a photoelectric conversion. Thereby, electric charges representing the scene image are produced.

When a power source is applied, under a main task, a CPU 26 determines a setting (i.e., an operation mode at a current time point) of a mode selector switch 28md arranged in a key input device 28. If the operation mode at the current time point is a pet registration mode, a pet registering task and a registration-use face detecting task are started up. Moreover, if the operation mode at the current time point is a pet imaging mode, on the condition that a pet image is already registered, a pet imaging task and an imaging-use face detecting task are started up.

When the pet registration mode is selected, the CPU 26 initializes an imaging setting under the pet registering task. Specifically, the CPU 26 performs following operations; setting an AF system to a pan-focus system, setting a curvature of a γ correction curve to "standard", and setting a photometric system to a center-weighted photometric system. As a result of setting the AF system to the pan-focus system, the drivers 18a and 18b adjust a position of the focus lens 12 and an aperture amount of the aperture unit 14 so that a depth of field becomes deep. It is noted that the curvature of the γ correction curve and the photometric system will be described later.

Subsequently, the CPU 26 commands a driver 18c to repeat an exposure procedure and an electric-charge reading-out procedure in order to start a moving-image taking process. In response to a vertical synchronization signal Vsync periodically generated from an SG (Signal Generator) not shown, the driver 18c exposes the imaging surface and reads out the electric charges produced on the imaging surface in a raster scanning manner. From the imager 16, raw image data based on the read-out electric charges is outputted periodically.

A pre-processing circuit 20 performs processes, such as digital clamp, pixel defect correction, and gain control, on the raw image data which is outputted from the imager 16. The raw image data on which these processes are performed is written into a raw image area 32a of an SDRAM 32 through a memory control circuit 30.

A post-processing circuit 34 reads out the raw image data accommodated in the raw image area 32a through the memory control circuit 30, and continuously executes common color separation process and white balance adjusting process to the read-out raw image data.

Furthermore, the post-processing circuit 34 continuously executes display-use γ correction process and YUV converting process together with searching-use γ correction process and YUV converting process, to the image data on which the white balance adjustment is performed. As a result, display image data and search image data that comply with a YUV format are individually created. The display image data is written into a display image area 32b of the SDRAM 32 by the memory control circuit 30. The search image data is written into a search image area 32c of the SDRAM 32 by the memory control circuit 30.

Herein, the display-use γ correction process is executed with reference to a predetermined γ correction curve while the searching-use γ correction process is executed with reference to the γ correction curve having the curvature set by the CPU 26. Moreover, the searching-use γ correction process is executed by a γ correcting circuit 34c.

As described above, the curvature of the γ correction curve is set to "standard" in the pet registration mode. Moreover, the γ correction curve having the curvature of "standard" depicts a curve CV1 shown in FIG. 10. Thus, when the pet registration mode is selected, the γ correcting circuit 34c executes the searching-use γ correction process with reference to the curve CV1 shown in FIG. 10. The search image data indicates a tonality corresponding to the curve CV1.

An LCD driver 36 repeatedly reads out the display image data accommodated in the display image area 32b through the memory control circuit 30, and drives an LCD monitor 38 based on the read-out image data. As a result, a real-time moving image (through image) of the scene is displayed on a monitor screen.

Moreover, under the registration-use face detecting task executed in parallel with the pet registering task, the CPU 26 searches for a face image of an animal from the search image data accommodated in the search image area 32c. For the registration-use face detecting task, a general dictionary GLDC shown in FIG. 3 and a register RGST1 shown in FIG. 4 are prepared.

In the general dictionary GLDC shown in FIG. 3, face patterns FP_1 to FP_45 respectively represent characteristics of faces of dogs of 45 species, face patterns FP_46 to FP_60 respectively represent characteristics of faces of cats of 15 species, and face patterns FP_61 to FP_70 respectively represent characteristics of faces of rabbits of 10 species. That is, in FIG. 3, a name of the species is allocated to each of face pattern numbers FP_1 to FP_70, however, in reality, a characteristic amount of the face is allocated.

Figure 5:
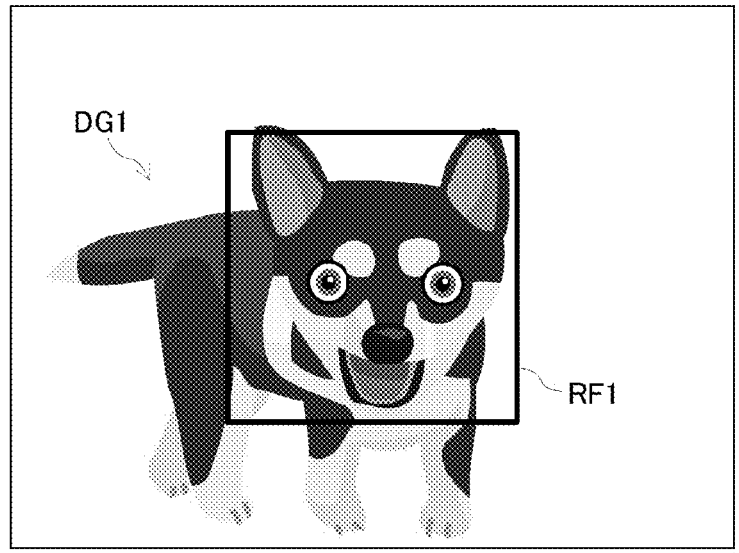
FIG. 5 (A) is an illustrative view showing one example of an image representing an animal captured corresponding to multi-photometry in the pet registration mode.
Figure 5:
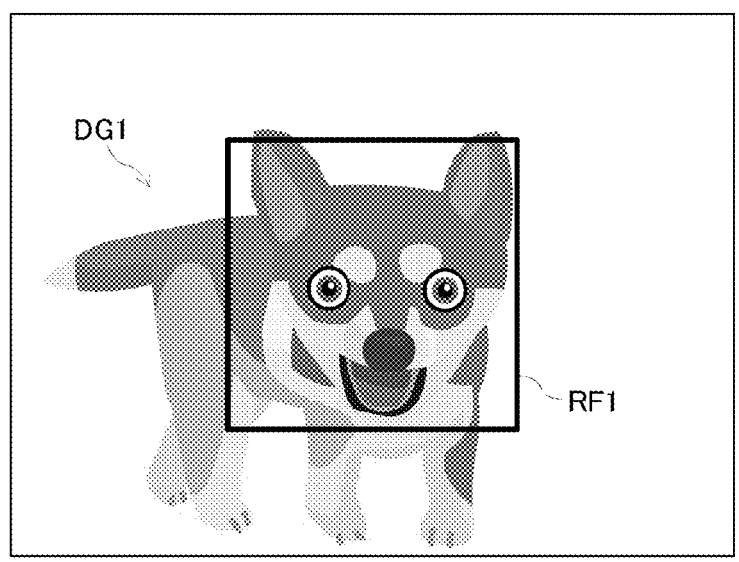

Under the registration-use face detecting task, firstly, a graphic generator 46 is requested to display a registration frame structure RF1. The graphic generator 46 outputs graphic data representing the registration frame structure RF1 toward the LCD driver 36. The registration frame structure RF1 is displayed at a center of the LCD monitor 38 as shown in FIG. 5 (A), FIG. 5 (B) or FIG. 6.

Subsequently, a flag FLG_A is set to "0", and a flag FLG_B is set to "0". Herein, the flag FLG_A is a flag for identifying whether or not a face pattern in which a checking degree exceeds a reference value REF is discovered, and "0" indicates being undiscovered while "1" indicates being discovered. Moreover, the flag FLG_B is a flag for identifying whether or not a reference-face-pattern number is determined, and "0" indicates being undetermined while "1" indicates being determined. It is noted that the reference-face-pattern number is a face pattern number which is referred to in image searching under the imaging-use face detecting task.

Figure 7:
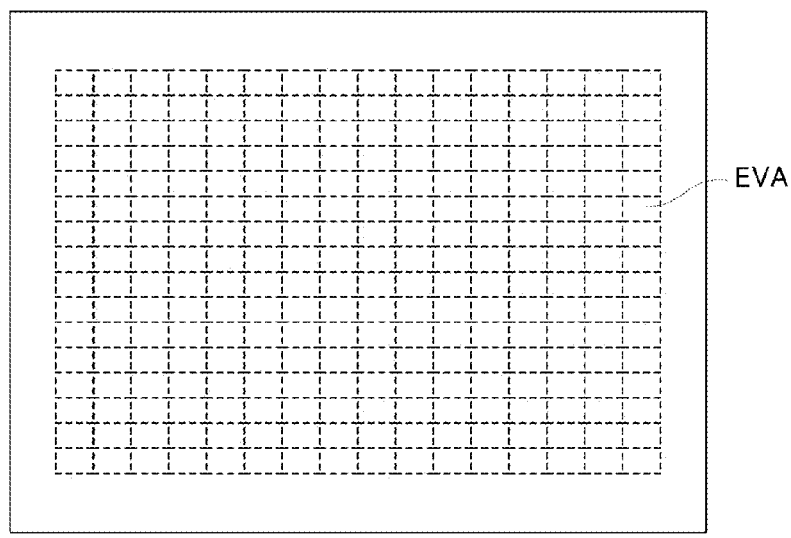
FIG. 7 is an illustrative view showing one example of a state where an evaluation area is allocated to an imaging surface.

With reference to FIG. 7, an evaluation area EVA is allocated to a center of the imaging surface. The evaluation area EVA is divided into 16 portions in each of a horizontal direction and a vertical direction; therefore, 256 divided areas form the evaluation area EVA. Moreover, in addition to the above-described processes, the pre-processing circuit 20 shown in FIG. 2 executes a simple RGB converting process which simply converts the raw image data into RGB data.

An AE evaluating circuit 22 integrates RGB data belonging to the evaluation area EVA, out of the RGB data produced by the pre-processing circuit 20, at each generation of the vertical synchronization signal Vsync. Thereby, 256 integral values, i.e., 256 AE evaluation values, are outputted from the AE evaluating circuit 22 in response to the vertical synchronization signal Vsync.

When the flag FLG_B indicates "0", under the pet registering task, the CPU 26 executes a simple AE process that is based on the output from the AE evaluating circuit 22, so as to calculate an appropriate EV value. Since the photometric system is set to the center-weighted photometric system in response to selecting the pet registration mode, the simple AE process is executed in a manner where an object belonging to the registration frame structure RF1 is emphasized. To the driver 18c, an exposure time period which defines the appropriate EV value together with the aperture amount corresponding to the pan-focus setting is set. As a result, out of the through image displayed on the LCD monitor 38, a brightness of an image being outside of the registration frame structure RF1 is excessively increased while a brightness of an image belonging to the registration frame structure RF1 is adjusted moderately.

Figure 6:
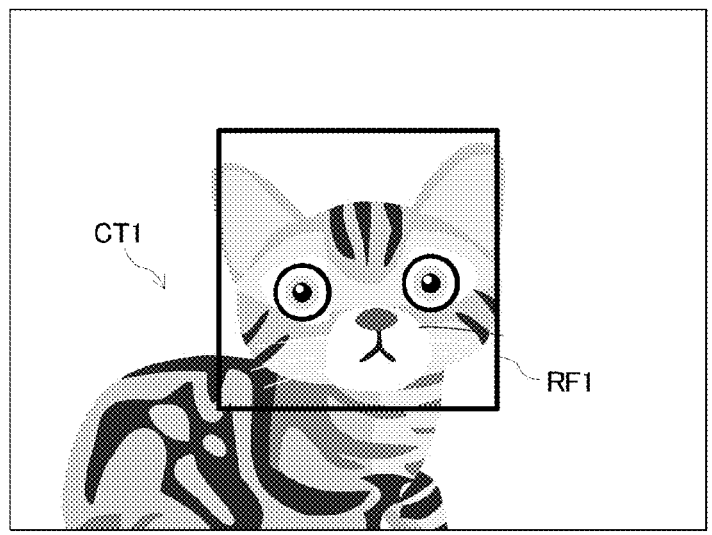
FIG. 6 is an illustrative view showing one example of an image representing an animal captured in the pet registration mode.

Thus, in a case where a dog DG1 having a blackish color is captured as shown in FIG. 5 (A) or FIG. 5 (B), an image representing the dog DG1 maintains an original color corresponding to a multi-photometric system while changes to gray corresponding the center-weighted photometric system. On the other hand, in a case where a cat CT1 having a whitish color is captured as shown in FIG. 6, an image representing the cat CT1 maintains an original color in any of the multi-photometric system and the center-weighted photometric system.

When the vertical synchronization signal Vsync is generated, a part of search image data belonging to the registration frame structure RF1 is read out from the search image area 32c so as to calculate a characteristic amount of the read-out search image data. Thus, in a case where the dog DG1 is captured as shown in FIG. 5 (A) or FIG. 5 (B), a characteristic amount of a face of the dog DG1 is calculated. Moreover, in a case where the cat CT1 is captured as shown in FIG. 6, a characteristic amount of a face of the cat CT1 is calculated.

Subsequently, a variable K is set to each of "1" to "70", and the calculated characteristic amount is checked with a characteristic amount of a face pattern FP_K. When a checking degree exceeds the reference value REF, the current face pattern number (=FP_K) and the checking degree are registered in the register RGST1 shown in FIG. 4, and the flag FLG_A is updated to "1".

Regarding the dog DG1 shown in FIG. 5 (A) or FIG. 5 (B), a checking degree corresponding to an Alaskan Malamute exceeds the reference value REF, and furthermore, a checking degree corresponding to a Siberian Husky exceeds the reference value REF. Thus, in the register RGST1, the checking degree corresponding to the Alaskan Malamute is registered together with a face pattern number of the Alaskan Malamute (=FP_2), and furthermore, the checking degree corresponding to the Siberian Husky is registered together with a face pattern number of the Siberian Husky (=FP_3).

Regarding the cat CT1 shown in FIG. 6, a checking degree corresponding to an American Short Hair exceeds the reference value REF, and furthermore, a checking degree corresponding to an Egyptian Mau exceeds the reference value REF. Thus, in the register RGST1, the checking degree corresponding to the American Short Hair is registered together with a face pattern number of the American Short Hair (=FP_47), and furthermore, the checking degree corresponding to the Egyptian Mau is registered together with a face pattern number of the Egyptian Mau (=FP_48).

When the flag FLG_A indicates "1" at a time point at which the above-described process corresponding to K=70 is completed, out of the face pattern numbers registered in the register RGST1, a face pattern number corresponding to a maximum checking degree is determined as the reference-face-pattern number.

In an example of FIG. 5 (A) or FIG. 5 (B), when the checking degree corresponding to the Siberian Husky is higher than the checking degree corresponding to the Alaskan Malamute, "FP_3" is determined as the reference-face-pattern number. Moreover, in an example of FIG. 6, when the checking degree corresponding to the American Short Hair is higher than the checking degree corresponding to the Egyptian Mau, "FP_47" is determined as the reference-face-pattern number. The flag FLG_B is updated to "1" in order to declare that the reference-face-pattern number is determined.

When the flag FLG_B is updated to "1", the CPU 26 changes the photometric system to the multi-photometric system in order to adjust the exposure amount by considering a brightness of whole imaging surface, and thereafter executes a strict AE process. The strict AE process is also executed based on the output of the AE evaluating circuit 22, and thereby, an optimal EV value is calculated. To the driver 18c, an exposure time period which defines the optimal EV value together with the aperture amount corresponding to the pan-focus setting is set. A brightness of the through image is strictly adjusted by considering the whole of the imaging surface.

Subsequently, with reference to the search image data which is created after the strict AE process, the CPU 26 identifies whether a color of the object (=a face portion of the animal) belonging to the registration frame structure RF1 is "black" or "non-black". The identified result indicates "black" corresponding to the dog DG1 shown in FIG. 5 (A) while indicates "non-black" corresponding to the cat CT1 shown in FIG. 6.

Upon completion of the identifying process, the CPU 26 executes a still-image taking process. One frame of image data immediately after the identifying process is completed is taken by the still-image taking process into a still-image area 32d.

Thereafter, the CPU 26 cuts out partial image data belonging to the registration frame structure RF1 out of the image data which is taken into the still-image area 32d, and reduces the cut-out image data. Thereby, registered pet image data is obtained.

The reference-face pattern number determined under the registration-use face detecting task and color information obtained by the above-described identifying process are allocated to the registered pet image data. The registered pet image data, the reference-face pattern number and the color information being associated with each other are stored in a flash memory 44 as an extraction dictionary EXDC.

In the example of FIG. 5 (A) or FIG. 5 (B), the reference-face pattern number indicating "FP_3" and the color information indicating "black" are allocated to registered pet image data representing the face of the dog DG1. Moreover, in an example of FIG. 6, the reference-face pattern number indicating "FP_47" and the color information indicating "non-black" are allocated to registered pet image data representing the face of the cat CT1. Thus, when the dog DG1 shown in FIG. 5 (A) or FIG. 5 (B) is firstly photographed, the extraction dictionary EXDC shown in FIG. 8 (A) is newly created. When the cat CT1 shown in FIG. 6 is subsequently photographed, the extraction dictionary EXDC is updated as shown in FIG. 8 (B).

When the pet imaging mode is selected instead of the pet registration mode, under the pet imaging task, the CPU 26 reads out the registered pet image data contained in the extraction dictionary EXDC from the flash memory 44, and develops the read-out registered pet image data to the display image area 32b of the SDRAM 32. The LCD driver 36 reads out the developed registered pet image data through the memory control circuit 30, and drives the LCD driver 36 based on the read-out registered pet image data.

Figure 8:
FIG. 8 (A) is an illustrative view showing one example of an extraction dictionary created in the pet registration mode.
Figure 9:
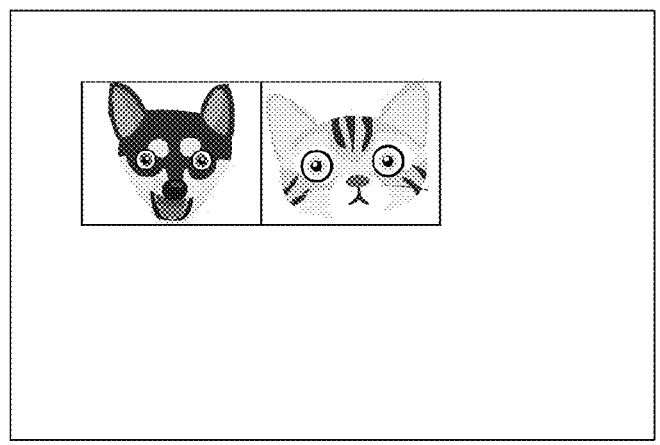
FIG. 9 is an illustrative view showing one example of a registered pet image displayed on a monitor screen in a pet imaging mode.

Thus, when the extraction dictionary EXDC is created as shown in FIG. 8 (B), two registered pet images representing the dog DG1 and the cat CT1 are displayed on the LCD monitor 38 as shown in FIG. 9.

When a selection operation which selects any one of the displayed registered pet images is performed, the CPU 26 reads out a characteristic amount of a reference face pattern corresponding to the selected registered pet image from the general dictionary GLDC. In a case where the registered pet image representing the dog DG1 is selected in the example of FIG. 9, a characteristic amount of the face pattern FP_3 is read out from the general dictionary GLDC. In a case where the registered pet image representing the cat CT1 is selected in the example of FIG. 9, a characteristic amount of the face pattern FP_47 is read out from the general dictionary GLDC.

Subsequently, the CPU 26 determines whether the color information allocated to the selected registered pet image is "black" or "non-black" with reference to the extraction dictionary EXDC, so as to set the curvature of the γ correction curve to "strong" corresponding to the color information of "black" while set the same to "standard" corresponding to the color information of "non-black".

Figure 10:
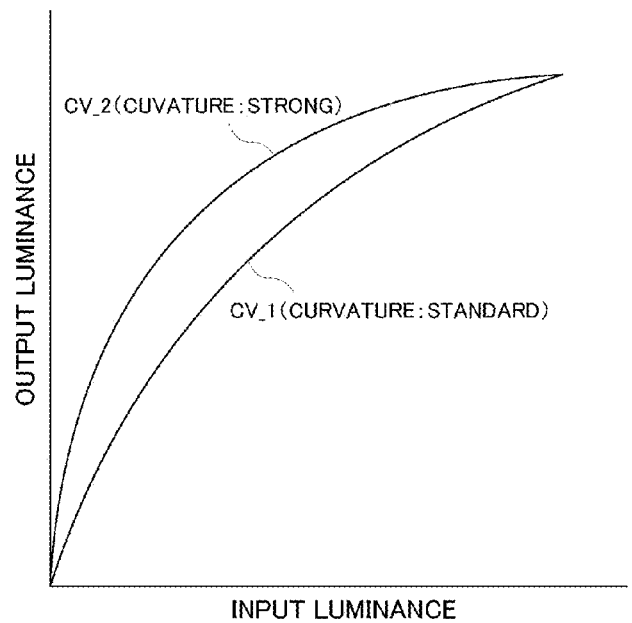
FIG. 10 is a graph showing one example of a γ correction curve referred to by a γ correcting circuit applied to the embodiment in FIG. 2.
Figure 11:
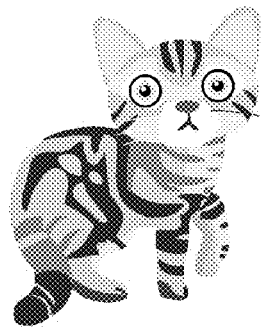
FIG. 11 (A) is an illustrative view showing one example of an animal image which has a tonality adjusted with reference to a γ correction curve having a standard curvature.
Figure 11:
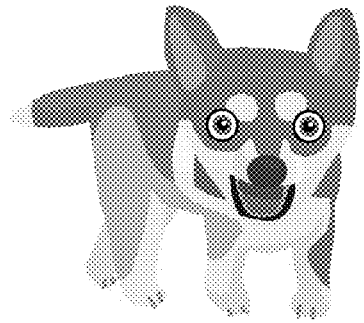

With reference to FIG. 10, the curve CV1 has the "standard" curvature, and a curve CV2 has the "strong" curvature. The γ correcting circuit 34c executes the γ correction process with reference to the curve CV1 when the noticed color information is "non-black" while executes the γ correction process with reference to the curve CV2 when the noticed color information is "black". Thus, a tonality of search image data representing the cat CT1 is corrected as shown in FIG. 11 (A), and a tonality of search image data representing the dog DG1 is corrected as shown in FIG. 11 (B).

Upon completion of the setting of the curvature, the CPU 26 starts the moving-image taking process under the pet imaging task. Thereby, the through image is displayed on the LCD monitor 38, and the search image data having the tonality which is corrected with reference to the curve CV1 or CV2 is repeatedly written in the search image area 32c.

Figure 12:
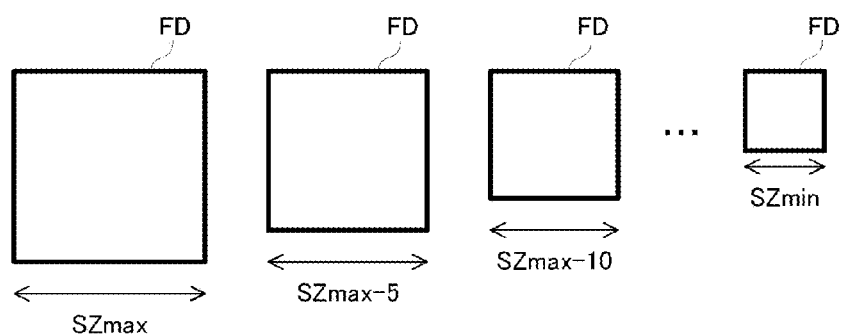
FIG. 12 is an illustrative view showing one example of a face-detection frame structure used in an imaging-use face detecting task.

Under the imaging-use face detecting task executed in parallel with the pet imaging task, the CPU 26 searches for the face image of the animal from the search image data accommodated in the search image area 32c. The face image to be searched is the image coincident with the registered pet image which is selected by the selection operation. For the imaging-use face detecting task, a plurality of face-detection frame structures FD, FD, FD, . . . shown in FIG. 12 are prepared.

Figure 13:
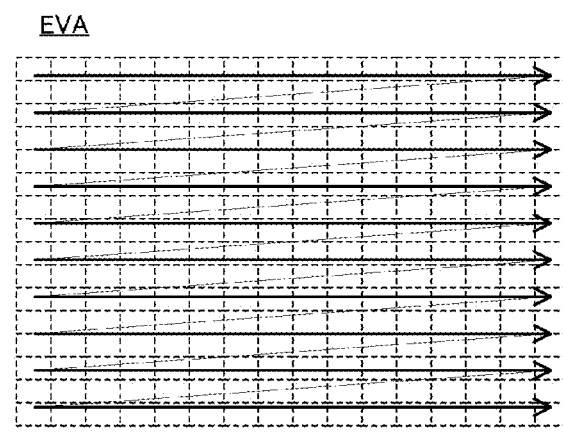
FIG. 13 is an illustrative view showing one portion of a face detection process in the imaging-use face detecting task.

The face-detection frame structure FD is moved in a raster scanning manner corresponding to the evaluation area EVA on the search image area 32b (see FIG. 13), at each generation of the vertical synchronization signal Vsync. The size of the face-detection frame structure FD is reduced by a scale of "5" from "200" to "20" at each time the raster scanning is ended.

The CPU 26 reads out image data belonging to the face-detection frame structure FD from the search image area 32b through the memory control circuit 30 so as to calculate a characteristic amount of the read-out image data. The calculated characteristic amount is checked with the characteristic amount of the reference face pattern. When the checking degree exceeds the reference value REF, a position and a size of the face-detection frame structure FD at a current time point are determined as the size and position of the face image, and a flag FLGpet is updated from "0" to "1".

Under the pet imaging task, the CPU 26 repeatedly executes the simple AE process corresponding to FLGpet=0. The simple AE process is executed according to the multi-photometric system, and as a result, the brightness of the through image is adjusted moderately. When the flag FLGpet is updated to "1", the CPU 26 requests the graphic generator 46 to display a face frame structure KF1. The graphic generator 46 outputs graphic data representing the face frame structure KF1 toward the LCD driver 36. The face frame structure KF1 is displayed on the LCD monitor 38 in a manner adapted to the position and size of the face image that are determined under the imaging-use face detecting task.

Figure 14:
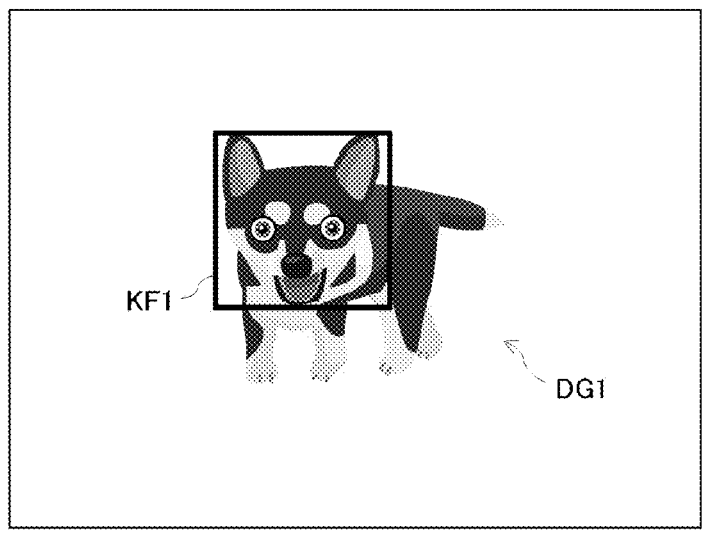
FIG. 14 is an illustrative view showing one example of an image representing an animal captured in the pet imaging mode.
Figure 15:
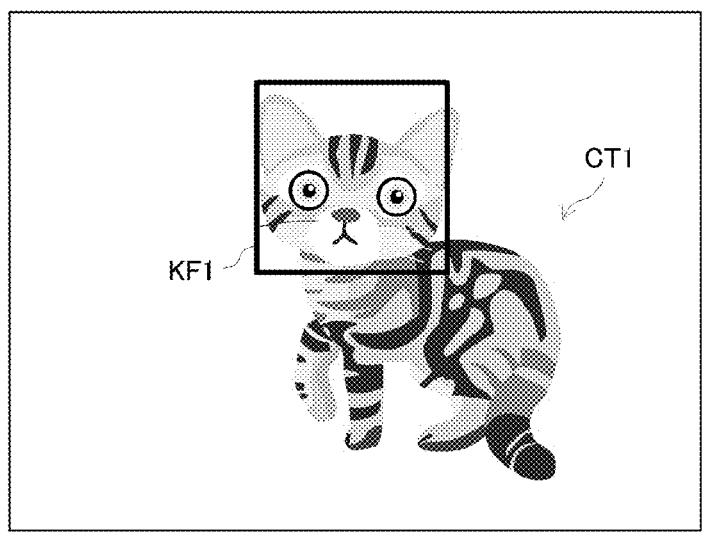
FIG. 15 is an illustrative view showing another example of the image representing the animal captured in the pet imaging mode.

Thus, when the dog DG1 is captured in a state where the registered pet image of the dog DG1 is selected, the face frame structure KF1 is displayed on the LCD monitor 38 as shown in FIG. 14. Moreover, when the cat CT1 is captured in a state where the registered pet image of the cat CT1 is selected, the face frame structure KF1 is displayed on the LCD monitor 38 as shown in FIG. 15.

Returning to FIG. 2, an AF evaluating circuit 24 extracts a high-frequency component of G data belonging to the evaluation area EVA out of the RGB data outputted from the pre-processing circuit 20, and integrates the extracted high-frequency component at each generation of the vertical synchronization signal Vsync. Thereby, 256 integral values, i.e., 256 AF evaluation values, are outputted from the AF evaluating circuit 24 in response to the vertical synchronization signal Vsync.

After the face frame structure KF1 is displayed, the CPU 26 executes the strict AE process and the AF process under the pet imaging task. The strict AE process is executed in the multi-photometric system. Moreover, the AF process is executed in a hill-climbing system referring to the output of the AF evaluating circuit 24, and the focus lens 12 is set to a focal point. Thereby, the brightness and a sharpness of the through image are improved.

Upon completion of the AF process, the still-image taking process and a recording process are executed. One frame of the image data immediately after the AF process is completed is taken by the still-image taking process into the still-image area 32d. The taken one frame of the image data is read out from the still-image area 32d by an I/F 40 which is started up in association with the recording process, and is recorded on a recording medium 42 in a file format. The face frame structure KF1 is non-displayed after the recording process is completed.

Figure 16:
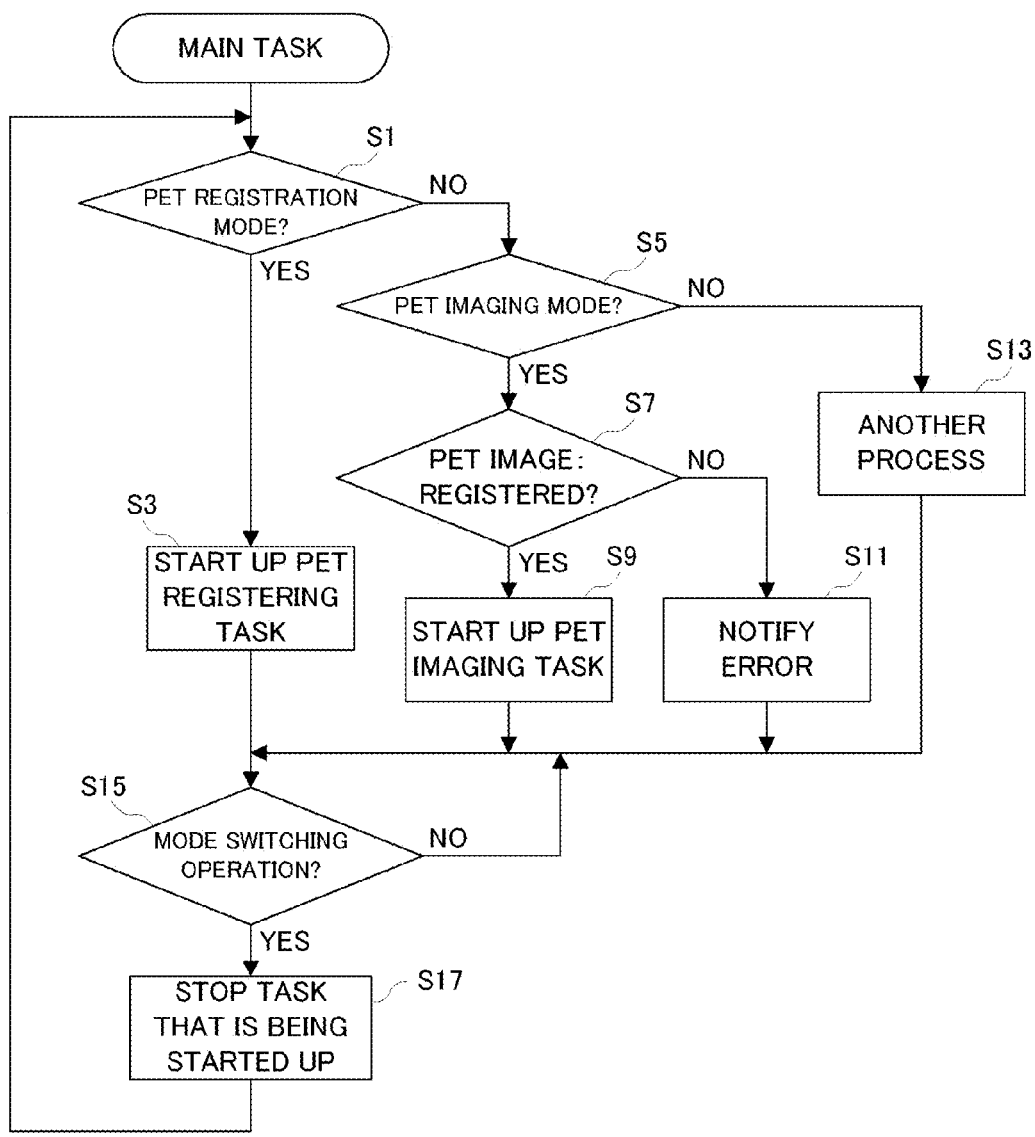
FIG. 16 is a flowchart showing one portion of behavior of a CPU applied to the embodiment in FIG. 2.
Figure 17:
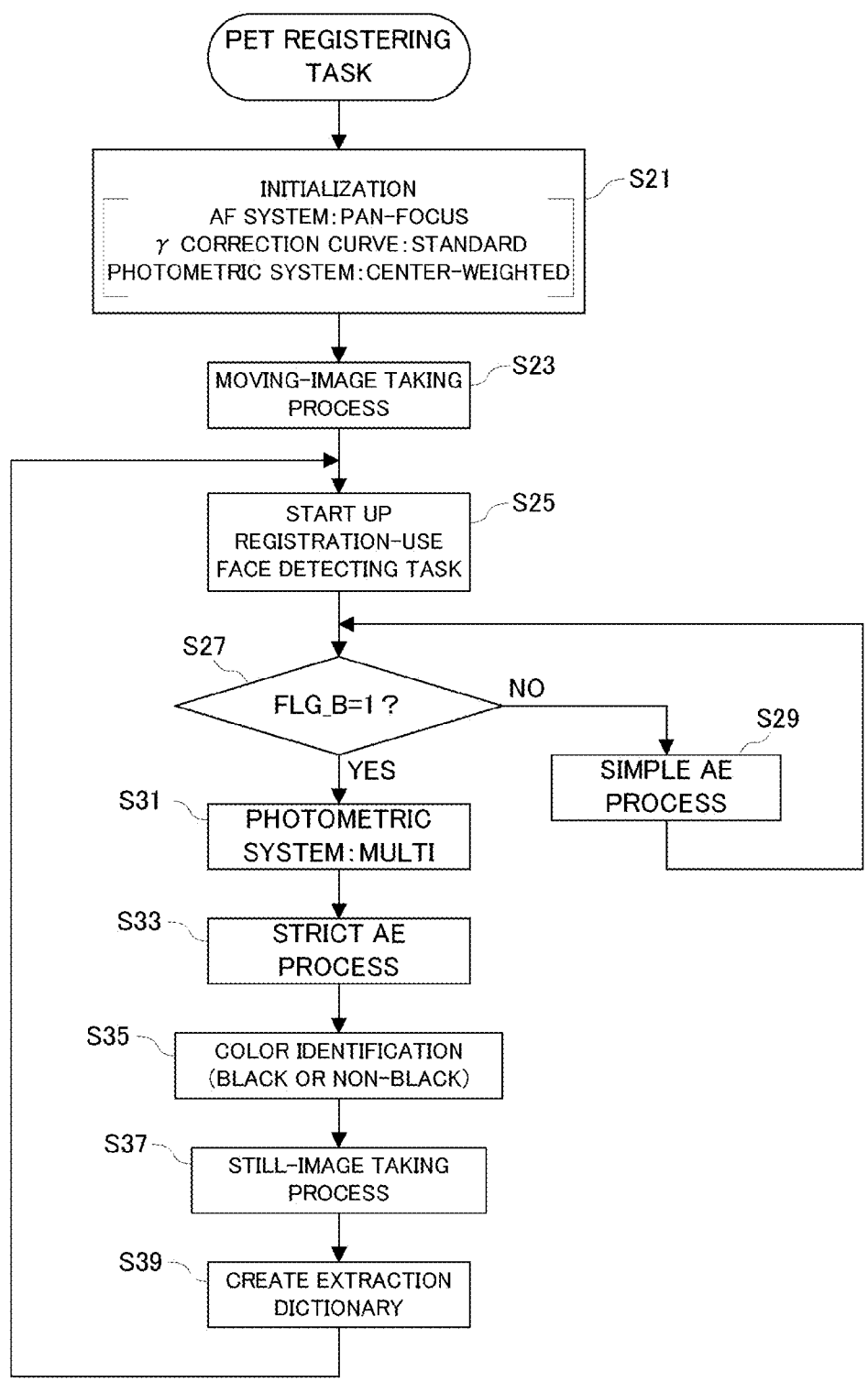
FIG. 17 is a flowchart showing another portion of behavior of the CPU applied to the embodiment in FIG. 2.
Figure 18:
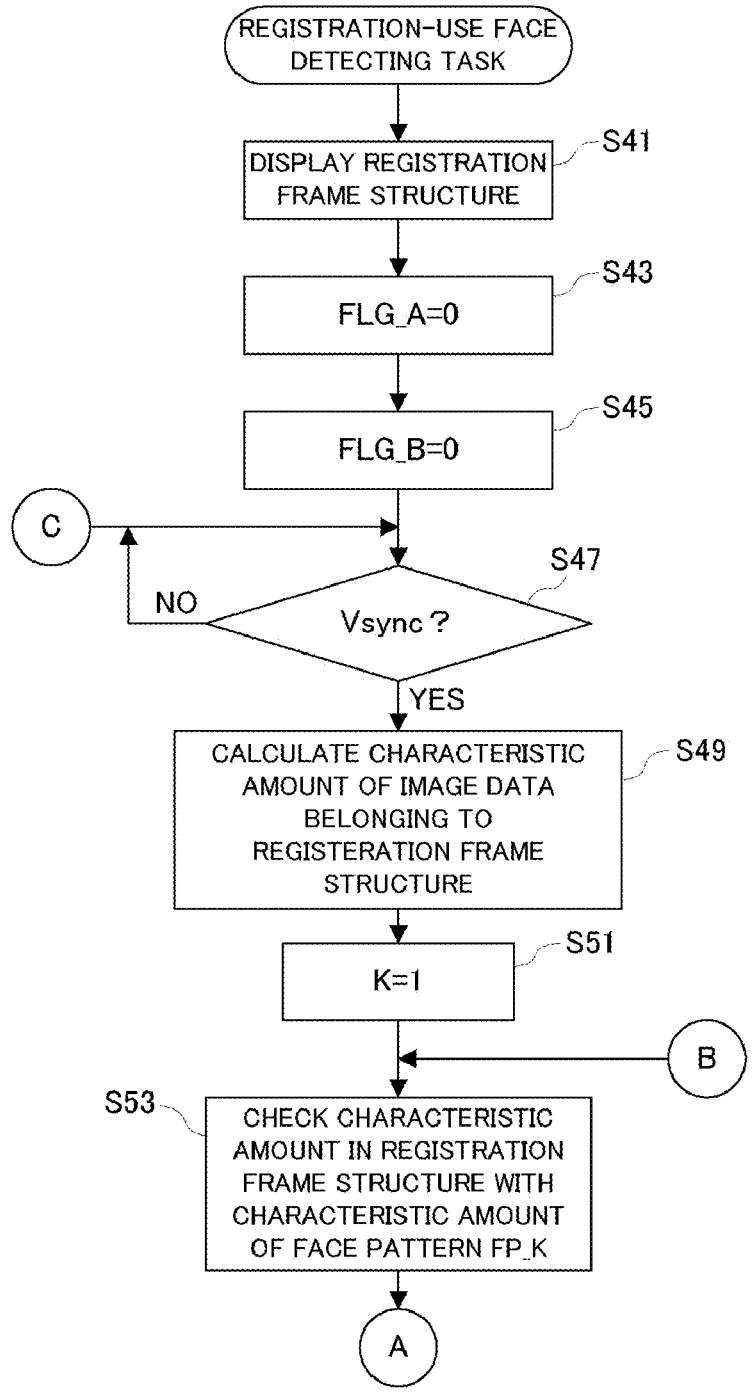
FIG. 18 is a flowchart showing still another portion of behavior of the CPU applied to the embodiment in FIG. 2.
Figure 19:
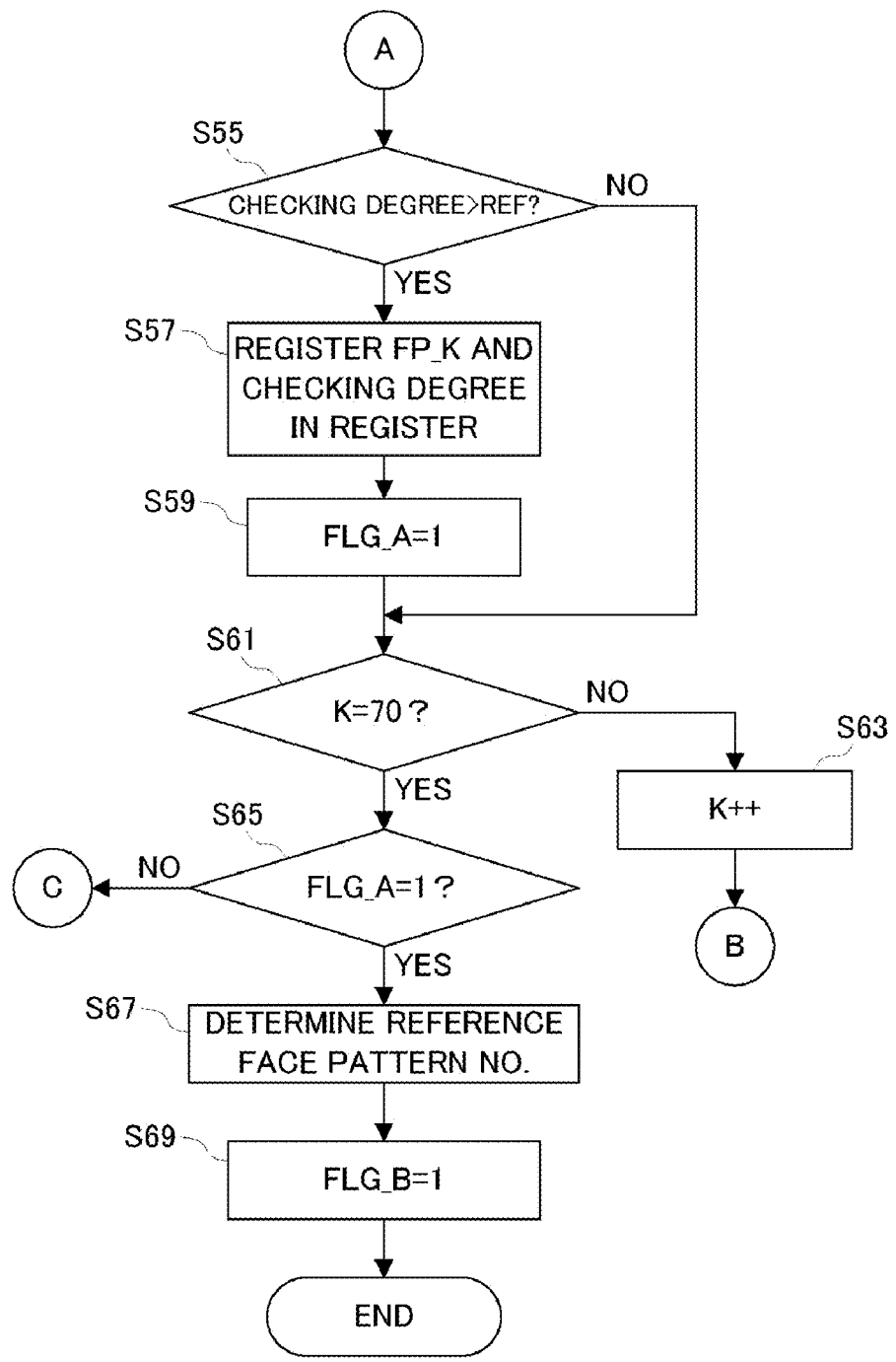
FIG. 19 is a flowchart showing yet another portion of behavior of the CPU applied to the embodiment in FIG. 2.
Figure 20:
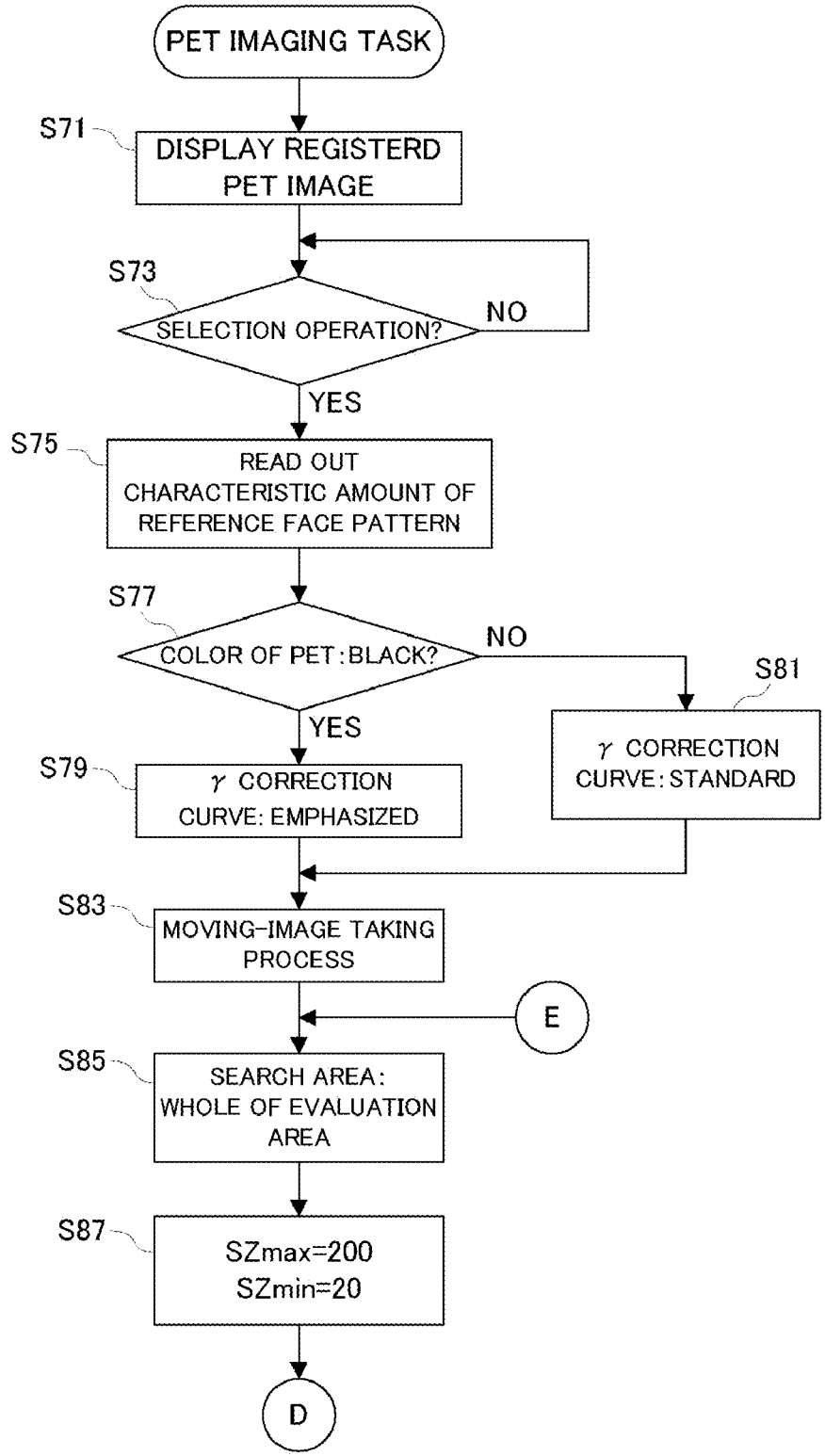
FIG. 20 is a flowchart showing another portion of behavior of the CPU applied to the embodiment in FIG. 2.
Figure 21:
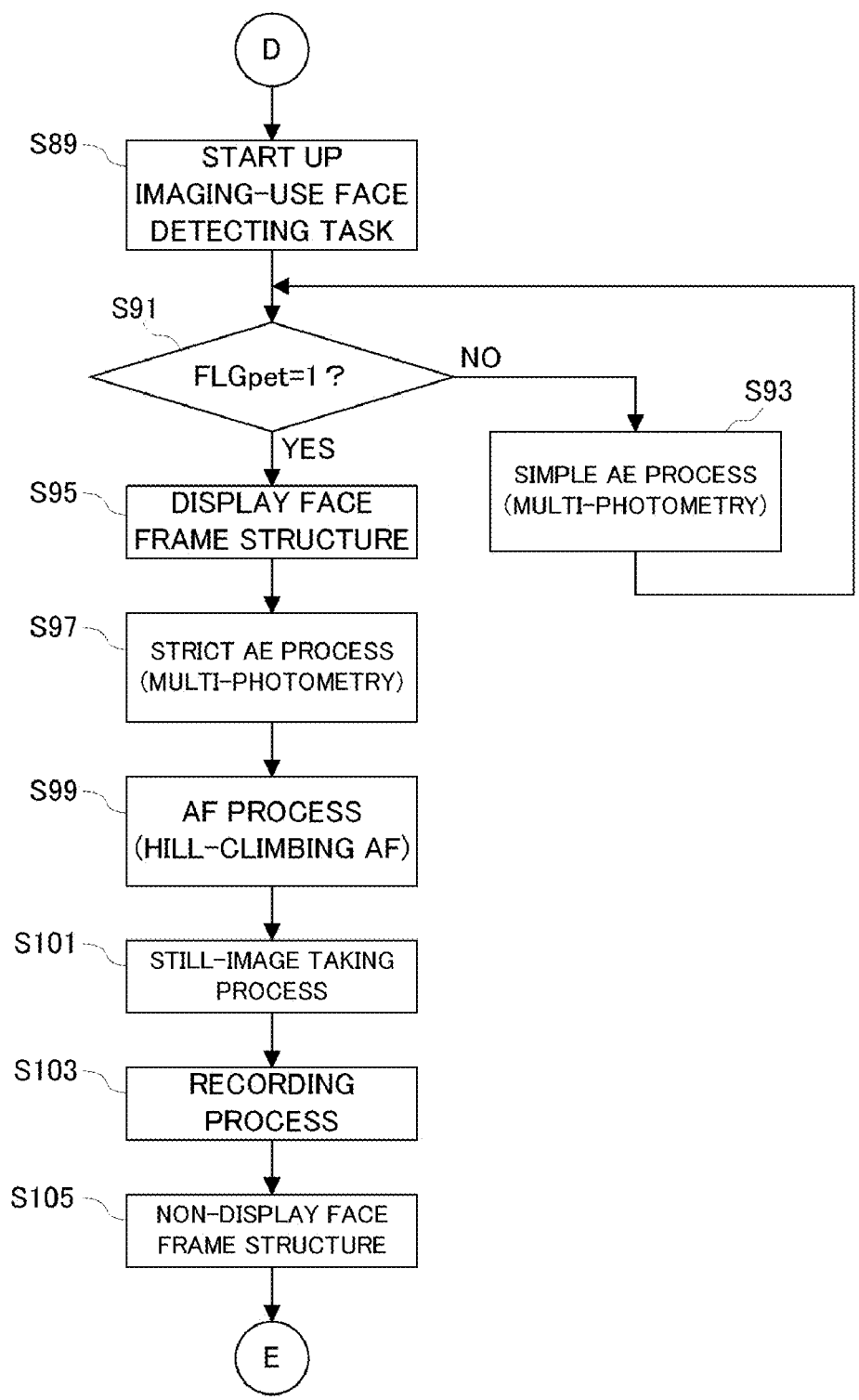
FIG. 21 is a flowchart showing still another portion of behavior of the CPU applied to the embodiment in FIG. 2.
Figure 22:
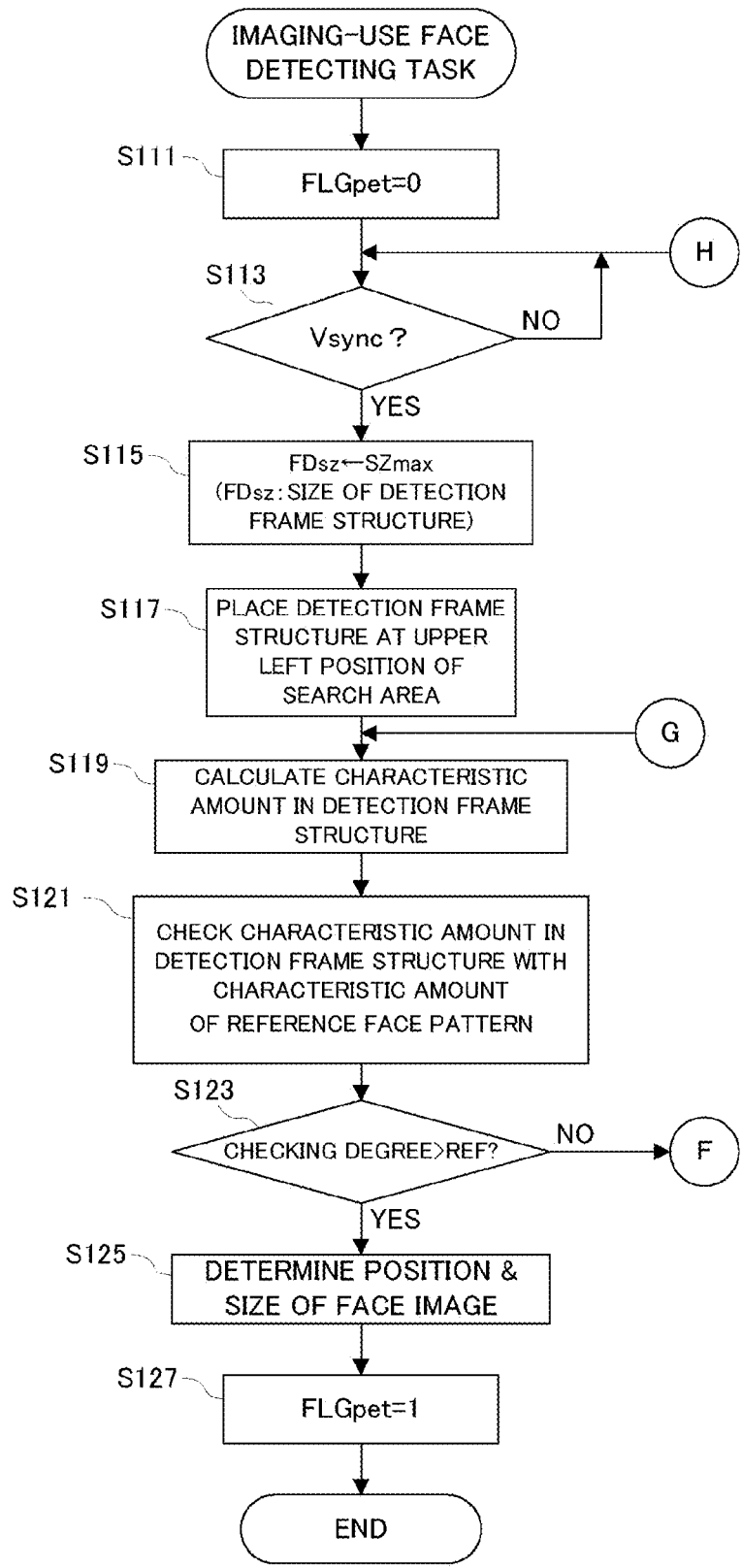
FIG. 22 is a flowchart showing yet another portion of behavior of the CPU applied to the embodiment in FIG. 2.
Figure 23:
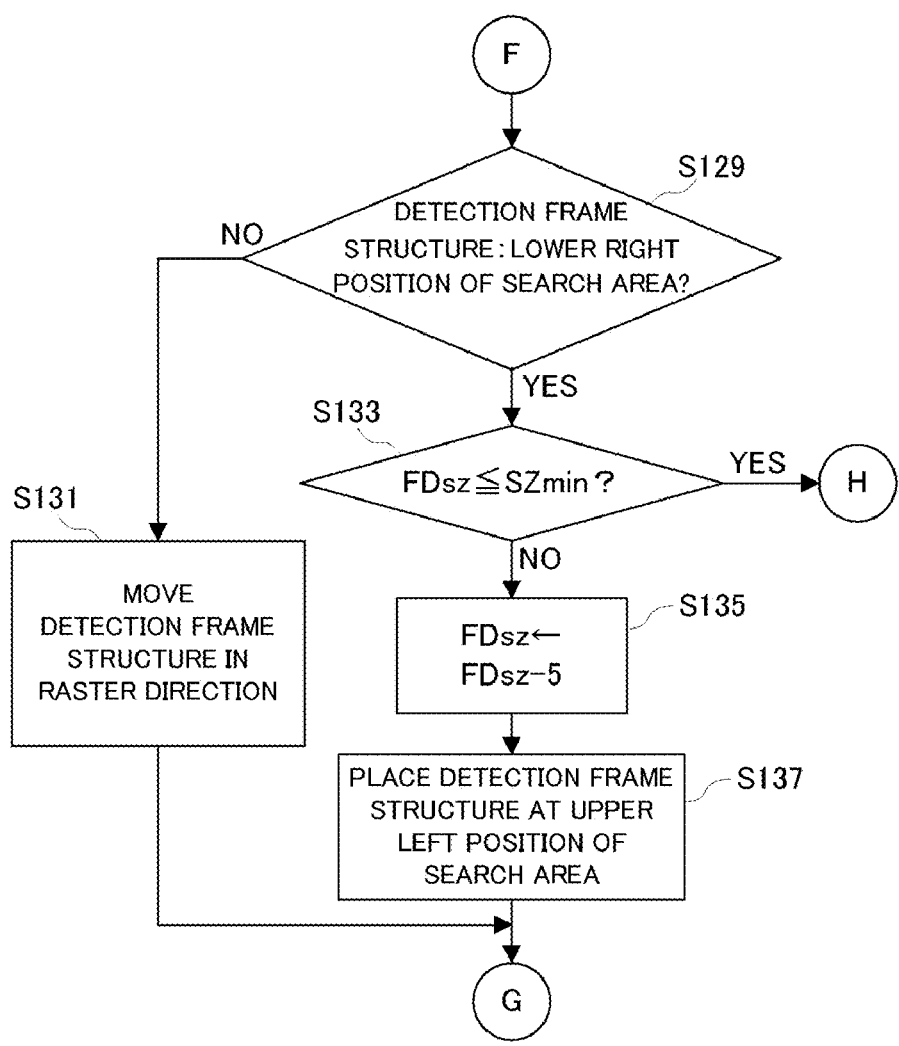
FIG. 23 is a flowchart showing another portion of behavior of the CPU applied to the embodiment in FIG. 2.

The CPU 26 executes a plurality of tasks including the main task shown in FIG. 16, the pet registering task shown in FIG. 17, the registration-use face detecting task shown in FIG. 18 to FIG. 19, the pet imaging task shown in FIG. 20 to FIG. 21, and the imaging-use face detecting task shown in FIG. 22 to FIG. 23. It is noted that control programs corresponding to these tasks are memorized in the flash memory 44.

With reference to FIG. 16, in a step S1, it is determined whether or not the operation mode at the current time point is the pet registration mode, and in a step S5, it is determined whether or not the operation mode at the current time point is the pet imaging mode. When YES is determined in the step S1, the pet registering task is started up in a step S3. When YES is determined in the step S5, it is determined whether or not the pet image is already registered (whether or not the extraction dictionary EXDC is already created) in a step S7. When the determined result is YES, the pet imaging task is started up in a step S9 while when the determined result is NO, the CPU 26 notifies an error in a step S11. When NO is determined in both the steps S1 and S5, another process is executed in a step S13. Upon completion of the processes in the step S3, S9, S11 or S13, it is repeatedly determined in a step S15 whether or not a mode switching operation is performed. When a determined result is updated from NO to YES, the task that is being started up is stopped in a step S17, and thereafter, the process returns to the step S1.

With reference to FIG. 17, in a step S21, the imaging setting is initialized. As a result, the AF system is set to the pan-focus system, the curvature of the γ correction curve is set to "standard", and the photometric system is set to the center-weighted photometric system.

As a result of setting the AF system to the pan-focus system, the drivers 18a and 18b adjust the position of the focus lens 12 and an aperture amount of the aperture unit 14 so that the depth of field becomes deep. Moreover, as a result of setting the curvature of the γ correction curve to "standard", the γ correcting circuit 34c executes the γ correction process with reference to the curve CV1 shown in FIG. 10. Furthermore, as a result of setting the photometric system to the center-weighted photometric system, the exposure amount is adjusted in the manner where the object belonging to the registration frame structure RF1 is emphasized.

Upon completion of the initialization, the moving-image taking process is executed in a step S23. As a result, the through image representing the scene is displayed on the LCD monitor 38, and the search image data having the tonality which is corrected with reference to the curve CV1 is repeatedly written in the search image area 32c. In a step S25, the registration-use face detecting task is started up.

The flag FLG_B is set to "0" as an initial setting under the registration-use face detecting task, and is updated to "1" when the reference-face-pattern number is determined. In a step S27, it is determined whether or not the flag FLG_B indicates "1", and when the determined result is NO, the simple AE process is executed in a step S29. Since the photometric system is set to the center-weighted photometric system, out of the through image, the brightness of the image being outside of the registration frame structure RF1 is excessively increased while the brightness of the image belonging to the registration frame structure RF1 is adjusted moderately.

When the flag FLG_B is updated from "0" to "1", the photometric system is changed to the multi-photometric system in a step S31, and the strict AE process is executed in a step S33. As a result of changing the photometric system, the exposure amount is strictly adjusted considering the brightness of the whole imaging surface. In a step S35, with reference to the search image data which is created after the strict AE process, the CPU 26 identifies whether the color of the object (=the face portion of the animal) belonging to the registration frame structure RF1 is "black" or "non-black". Upon completion of the identifying process, the still-image taking process is executed in a step S37. As a result, one frame of the image data immediately after the identifying process is completed is taken into the still-image area 32d.

In a step S39, the registered pet image data is created based on the image data taken into the still-image area 32d, and the reference-face pattern number determined under the registration-use face detecting task and the color information identified in the step S35 are allocated to the created registered pet image data. Thereby, the extraction dictionary EXDC is newly or additionally created. Upon creation of the extraction dictionary EXDC, the process returns to the step S25.

With reference to FIG. 18, in a step S41, the graphic generator 46 is requested to display the registration frame structure RF1. Thereby, the registration frame structure RF1 is displayed at the center of the LCD monitor 38. In a step S43, the flag FLG_A is set to "0", and in a step S45, the flag FLG_B is set to "0". In a step S47, it is determined whether or not the vertical synchronization signal Vsync is generated, and when the determined result is updated from NO to YES, the process advances to a step S49. In the step S49, a part of the search image data belonging to the registration frame structure RF1 is read out from the search image area 32c so as to calculate the characteristic amount of the read-out image data.

In a step S51, the variable K is set to "1", and in a step S53, the characteristic amount calculated in the step S49 is checked with the characteristic amount of the face pattern FP_K contained in the general dictionary GLDC. In a step S55, it is determined whether or not the checking degree exceeds the reference value REF, and when the determined result is NO, the process directly advances to a step S61 while when the determined result is YES, the process advances to the step S61 via steps S57 to S59. In the step S57, the current face pattern number (=FP_K) and the checking degree are registered in the register RGST1. In the step S59, the flag FLG_A is updated to "1" in order to declare that the face pattern in which the checking degree exceeds the reference value REF is discovered.

In the step S61, it is determined whether or not the variable K reaches "70". When the determined result is NO, the variable K is incremented in a step S63, and thereafter, the process returns to the step S53 while when the determined result is YES, in a step S65, it is determined whether or not the flag FLG_A indicates "1". When the flag FLG_A indicates "0", the process returns to the step S47, and when the flag FLG_A indicates "1", the reference-face-pattern number is determined in a step S67. The reference-face-pattern number is equivalent to the face pattern number corresponding to the maximum checking degree out of the face pattern numbers registered in the register RGST1. Upon completion of the process in the step S67, the flag FLG_B is updated to "1" in a step S69 in order to declare the determination of the reference-face-pattern number, and thereafter, the process is ended.

With reference to FIG. 20, in a step S71, the registered pet image data contained in the extraction dictionary EXDC is read out from the flash memory 44 so as to develop the read-out registered pet image data to the display image area 32b of the SDRAM 32. As a result, one or at least two registered pet images are displayed on the LCD monitor 38. In a step S73, it is determined whether or not the selection operation which selects any one of the displayed registered pet images is performed. When the determined result is updated from NO to YES, the process advances to a step S75 so as to read out the characteristic amount of the reference face pattern corresponding to the selected registered pet image from the general dictionary GLDC.

In a step S77, it is determined whether the color information allocated to the selected registered pet image is "black" or "non-black" with reference to the extraction dictionary EXDC. When the noticed color information is "black", the process advances to a step S79 so as to set the curvature of the γ correction curve to "strong". On the other hand, when the noticed color information is "non-black", the process advances to a step S81 so as to set the curvature of the γ correction curve to "standard". The γ correcting circuit 34c executes the γ correction process with reference to the γ correction curve having the set curvature.

Upon completion of the process in the step S79 or S81, the moving-image taking process is executed in a step S83 so as to set whole of the evaluation area EVA as a search area in a step S85. In a step S87, in order to define a variable range of the size of the face-detection frame structure FD, a maximum size SZmax is set to "200", and the minimum size SZmin is set to "20". Upon completion of the process in the step S87, the imaging-use face detecting task is started up in a step S89.

The flag FLGpet is set to "0" as an initial setting under the imaging-use face detecting task, and is updated to "1" when a face image coincident with the reference-face pattern is discovered. In a step S91, it is determined whether or not the flag FLGpet indicates "1", and as long as the determined result is NO, the simple AE process is repeatedly executed in a step S93. The simple AE process is executed according to the multi-photometric system, and the brightness of the through image is adjusted moderately.

When the determined result is updated from NO to YES, the process advances to a step S95, so as to request the graphic generator 46 to display the face frame structure KF1. The graphic generator 46 outputs the graphic data representing the face frame structure KF1 toward the LCD driver 36. The face frame structure KF1 is displayed on the LCD monitor 38 in a manner to surround the detected face image.

In a step S97, the strict AE process is executed according to the multi-photometric system, and in a step S99, the AF process is executed according to a hill-climbing AF system. As a result of the strict AE process and the AF process, the brightness and the focus of the through image are adjusted strictly. In a step S101, the still-image taking process is executed, and in a step S103, the recording process is executed. One frame of the image data immediately after the AF process is completed is taken by the still-image taking process into the still-image area 32d. The taken one frame of the image data is recorded by the recording process on the recording medium 42. Upon completion of the recording process, in a step S105, the graphic generator 46 is requested not to display the face frame structure KF1, and thereafter, the process returns to the step S85.

With reference to FIG. 22, in a step S111, the flag FLGpet is set to "0", and in a step S113, it is determined whether or not the vertical synchronization signal Vsync is generated. When the determined result is updated from NO to YES, in a step S115, the size of the face-detection frame structure FD is set to "SZmax", and in a step S117, the face-detection frame structure FD is placed at an upper left position of the search area. In a step S119, a part of the search image data belonging to the face-detection frame structure FD (image data having the tonality adjusted according to the setting in the step S79 or S81) is read out from the search image area 32c so as to calculate a characteristic amount of the read-out search image data.

In a step S121, the calculated characteristic amount is checked with the characteristic amount of the reference face pattern which is read out from the general dictionary GLDC, and in a step S123, it is determined whether or not the checking degree exceeds the reference value REF. When the determined result is YES, the process advances to a step S125, and when the determined result is NO, the process advances to a step S129.

In the step S125, the position and size of the face-detection frame structure FD at the current time point are determined as the position and size of the face image. The determining process is reflected in a face-frame-structure display process in the above-described step S95. The face frame structure KF1 is displayed on the LCD monitor 38 in a manner which adapts to the position and size of the face-detection frame structure FD at the current time point. Upon completion of the process in the step S125, the flag FLGpet is set to "1" in a step S127, and thereafter, the process is ended.

In the step S129, it is determined whether or not the face-detection frame structure FD reaches a lower right position of the search area. When the determined result is NO, in a step S131, the face-detection frame structure FD is moved in a raster direction by a predetermined amount, and thereafter, the process returns to the step S119. When the determined result is YES, in a step S133, it is determined whether or not the size of the face-detection frame structure FD is equal to or less than "SZmin". When the determined result is NO, in a step S135, the size of the face-detection frame structure FD is reduced by "5", and in a step S137, the face-detection frame structure FD is placed at the upper left position of the search area. Thereafter, the process returns to the step S119. When the determined result in the step S133 is YES, the process directly returns to the step S113.

As can be seen from the above-described explanation, the imager 16, having the imaging surface capturing the scene, repeatedly outputs the scene image. When the pet registration mode is selected, out of a plurality of face patterns contained in the general dictionary GLDC, the CPU 26 extracts a face pattern which satisfies a coincidence condition with a partial image belonging to the registration frame structure RF1 as the reference face pattern (S41~S69). Moreover, in parallel with the extraction process for the reference face pattern, the CPU 26 executes the simple AE process which adjusts the exposure amount of the imaging surface by emphasizing the registration frame structure RF1 (S21, S29), and identifies the color of the object (=a face portion of the animal) equivalent to the partial image in the registration frame structure RF1 (S35). When the pet imaging mode is selected, the CPU 26 corrects the tonality of the scene image outputted from the imager 16 with reference to the color identified in the pet registration mode (S77~S81), and searches for the partial image coincident with the reference face pattern from the scene image having the corrected tonality (S111~S137).

Thus, the reference face pattern is equivalent to the face pattern coincident with the partial image outputted corresponding to the registration frame structure RF1 on the imaging surface. When the extraction process for the reference face pattern is executed, the exposure amount of the imaging surface is adjusted by emphasizing the registration frame structure RF1. Thereby, the performance of extracting the reference face pattern is improved.

Moreover, the color of the object equivalent to the partial image outputted corresponding to the registration frame structure RF1 is identified corresponding to extracting the reference face pattern, and the tonality of the scene image used for searching for the partial image coincident with the reference face pattern is corrected with reference to the identified color. As a result, in cooperation with the above described improvement of the performance of extracting the reference face pattern, a performance of detecting the object corresponding to the reference face pattern is improved.

It is noted that, in this embodiment, the photometric system is changed from the center-weighted photometric system to the multi-photometric system prior to identifying the color of the object belonging to the registration frame structure RF1, and the color of the object belonging to the registration frame structure RF1 is identified with reference to the search image data based on the strict AE process according to the multi-photometric system (see the steps S31~S35 in FIG. 17). However, the color of the object belonging to the registration frame structure RF1 may be identified based on the search image data created by the simple AE process according to the center-weighted photometric system and the appropriate EV value calculated by the simple AE process according to the center-weighted photometric system. In this case, the process shown in FIG. 17 is partially corrected as shown in FIG. 24.

Figure 24:
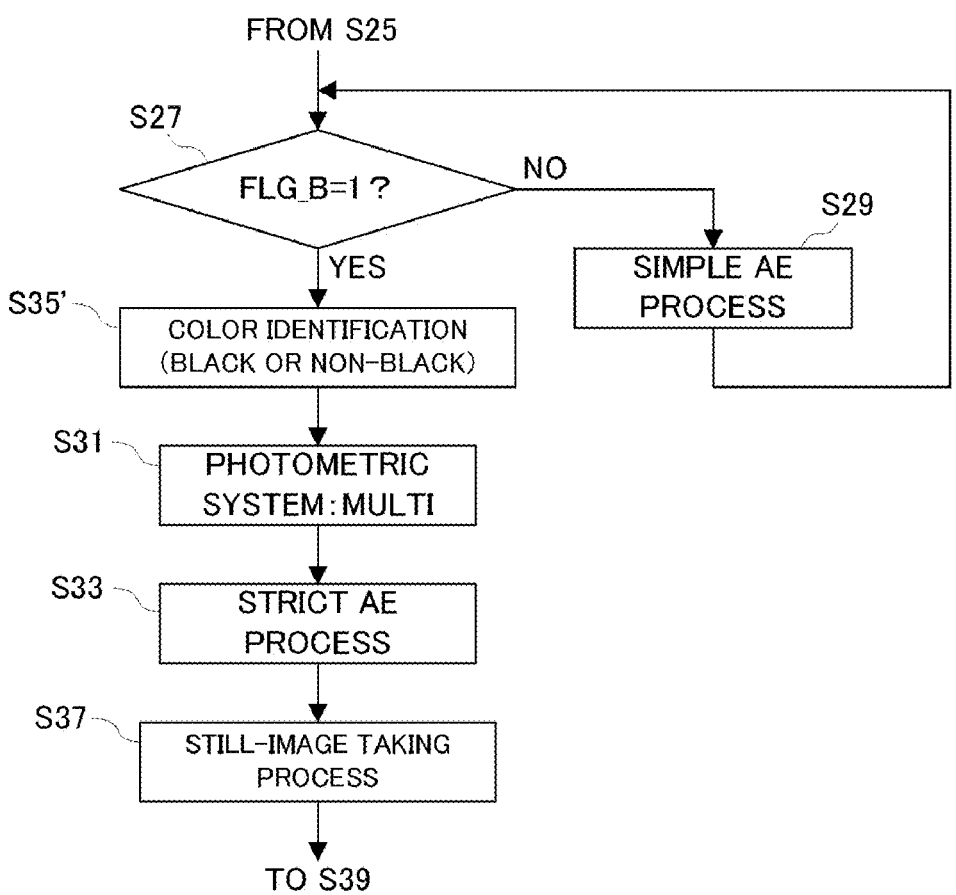
FIG. 24 is a flowchart showing one portion of behavior of the CPU applied to another embodiment.

With reference to FIG. 24, when the determined result in the step S27 is updated from NO to YES, the process advances to a step S35' and identifies the color of the object belonging to the registration frame structure RF1. In the identifying process, a part of the search image data belonging to the registration frame structure RF1 out of the search image data based on the simple AE process in the step S29 and the appropriate EV value calculated by the simple AE process in the step S29 are referred to. Upon completion of the process in the step S35', the photometric system is changed to the multi-photometric system in the step S31, and the strict AE process is executed in the step S33. The still-image taking process in the step S37 is executed following the strict AE process in the step S33.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic camera, comprising:
   an imager, having an imaging surface capturing a scene, which repeatedly outputs a scene image;
   an extractor which extracts a specific reference image coincident with a partial image outputted from said imager corresponding to a predetermined area allocated to the imaging surface, from among a plurality of reference images;
   an adjuster which executes a process of adjusting an exposure amount of the imaging surface by emphasizing the predetermined area in parallel with an extraction process of said extractor;
   an identifier which identifies a color of an object equivalent to the partial image noticed by said extractor, corresponding to extracting the specific reference image by said extractor;
   a corrector which executes a process of correcting a tonality of the scene image outputted from said imager with reference to an identified result of said identifier, in place of the extraction process of said extractor; and
   a searcher which searches for a partial image coincident with the specific reference image extracted by said extractor from the scene image having the tonality corrected by said corrector.

2. An electronic camera according to claim 1, further comprising a canceller which cancels an exposure adjustment system adopted by said adjuster corresponding to extracting the specific reference image by said extractor, wherein said identifier executes an identifying process based on the partial image outputted from said imager corresponding to the predetermined area after cancel by said canceller.

3. An electronic camera according to claim 2, wherein said adjuster selects any one of a center-weighted photometric system and a spot photometric system as the exposure adjustment system, and said canceller alternatively selects a multi-photometric system.

4. An electronic camera according to claim 1, wherein said identifier executes an identifying process based on the partial image outputted from said imager corresponding to the predetermined area in a state where an exposure adjustment system adopted by said adjuster is maintained and the exposure amount adjusted by said adjuster.

5. An electronic camera according to claim 1, further comprising a gradation corrector which performs a gradation correcting process referring to a gradation correction curve on the scene image outputted from said imager, wherein said corrector corrects a curvature of the gradation correction curve in a manner which is different corresponding to an identified result of said identifier.

6. An electronic camera according to claim 1, further comprising an allocator which allocates an identified result of said identifier to the specific reference image extracted by said extractor.

7. An electronic camera according to claim 1, wherein each of the plurality of reference images is equivalent to a face image of an animal.

8. An electronic camera according to claim 1, further comprising:
- a first starter which starts up said extractor in response to selecting an image extracting mode; and
- a second starter which starts up said corrector in response to selecting an image searching mode which is alternative to the image extracting mode.

9. a non-transitory computer readable storage medium having a computer-readable imaging control program product stored thereon and executed by a processor of an electronic camera provided with an imager, having an imaging surface capturing a scene, which repeatedly outputs a scene image, the imaging control program product comprising:
- an extracting step which extracts a specific reference image coincident with a partial image outputted from said imager corresponding to a predetermined area allocated to the imaging surface, from among a plurality of reference images;
- an adjusting step which executes a process of adjusting an exposure amount of the imaging surface by emphasizing the predetermined area in parallel with an extraction process of said extracting step;
- an identifying step which identifies a color of an object equivalent to the partial image noticed by said extracting step, corresponding to extracting the specific reference image by said extracting step;
- a correcting step which executes a process of correcting a tonality of the scene image outputted from said imager with reference to an identified result of said identifying step, in place of the extraction process of said extracting step; and
- a searching step which searches for a partial image coincident with the specific reference image extracted by said extracting step from the scene image having the tonality corrected by said correcting step.

10. An imaging control method executed by an electronic camera provided with an imager, having an imaging surface capturing a scene, which repeatedly outputs a scene image, the imaging control method comprising:
- an extracting step which extracts a specific reference image coincident with a partial image outputted from said imager corresponding to a predetermined area allocated to the imaging surface, from among a plurality of reference images;
- an adjusting step which executes a process of adjusting an exposure amount of the imaging surface by emphasizing the predetermined area in parallel with an extraction process of said extracting step;
- an identifying step which identifies a color of an object equivalent to the partial image noticed by said extracting step, corresponding to extracting the specific reference image by said extracting step;
- a correcting step which executes a process of correcting a tonality of the scene image outputted from said imager with reference to an identified result of said identifying step, in place of the extraction process of said extracting step; and
- a searching step which searches for a partial image coincident with the specific reference image extracted by said extracting step from the scene image having the tonality corrected by said correcting step.

* * * * *